July 4, 1967 J. BARRON 3,329,147
APPARATUS FOR BLADDER IRRIGATION AND MEDICATION
Filed Nov. 27, 1964 4 Sheets-Sheet 3
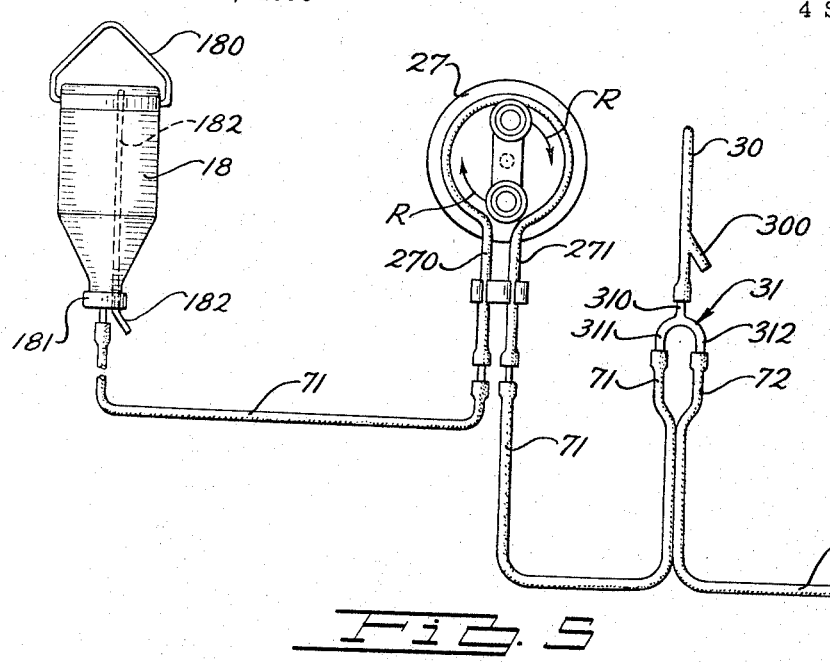
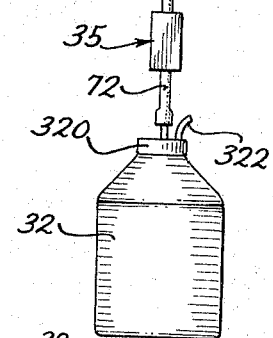
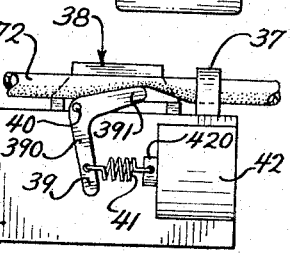
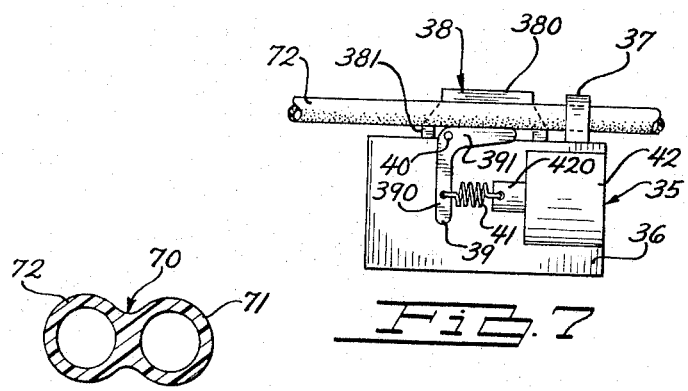
Inventor
JAMES BARRON
By Everett F. Wright
Attorney Inventor
JAMES BARRON
By Everett J. Wright
Attorney

United States Patent Office 3,329,147
Patented July 4, 1967

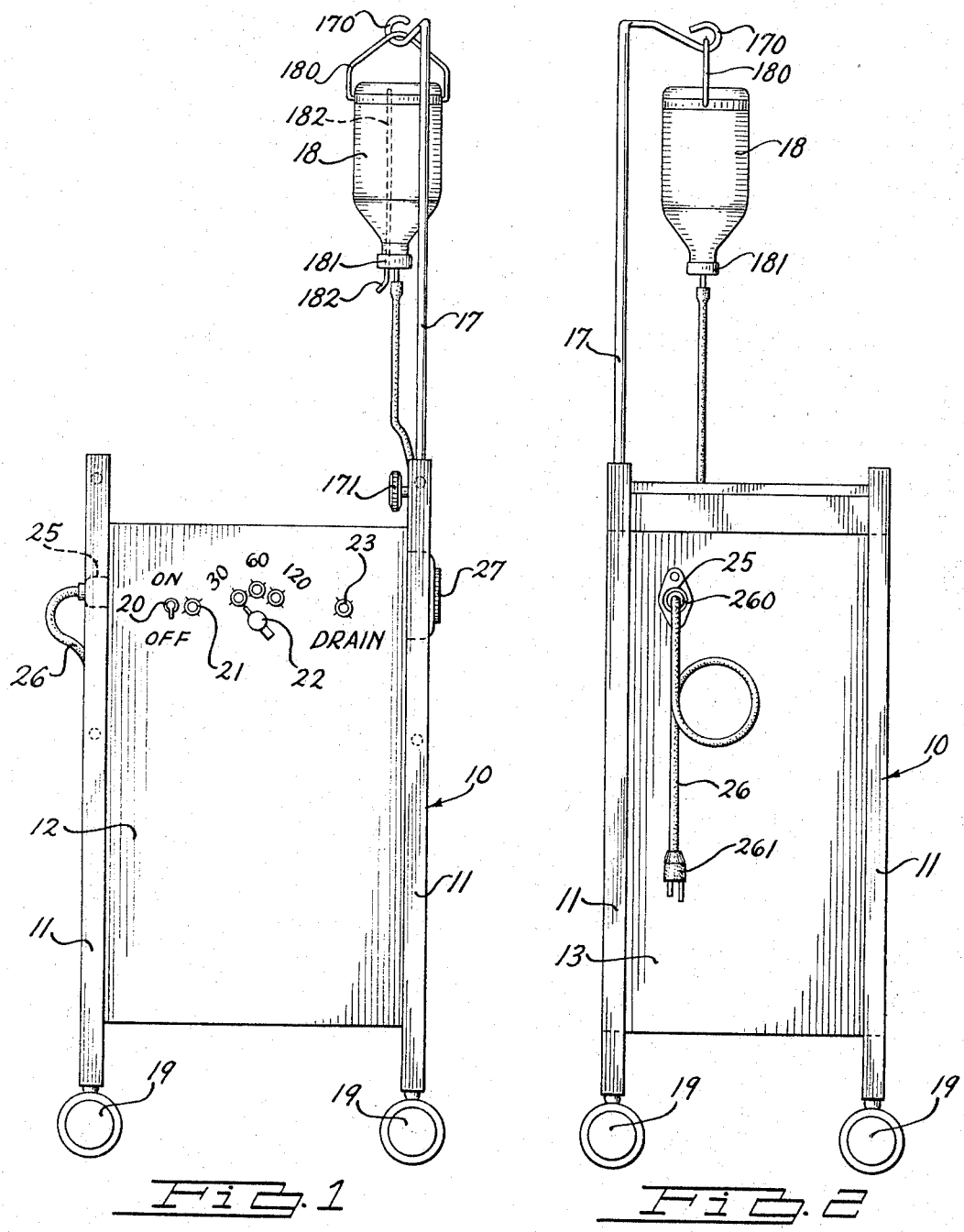

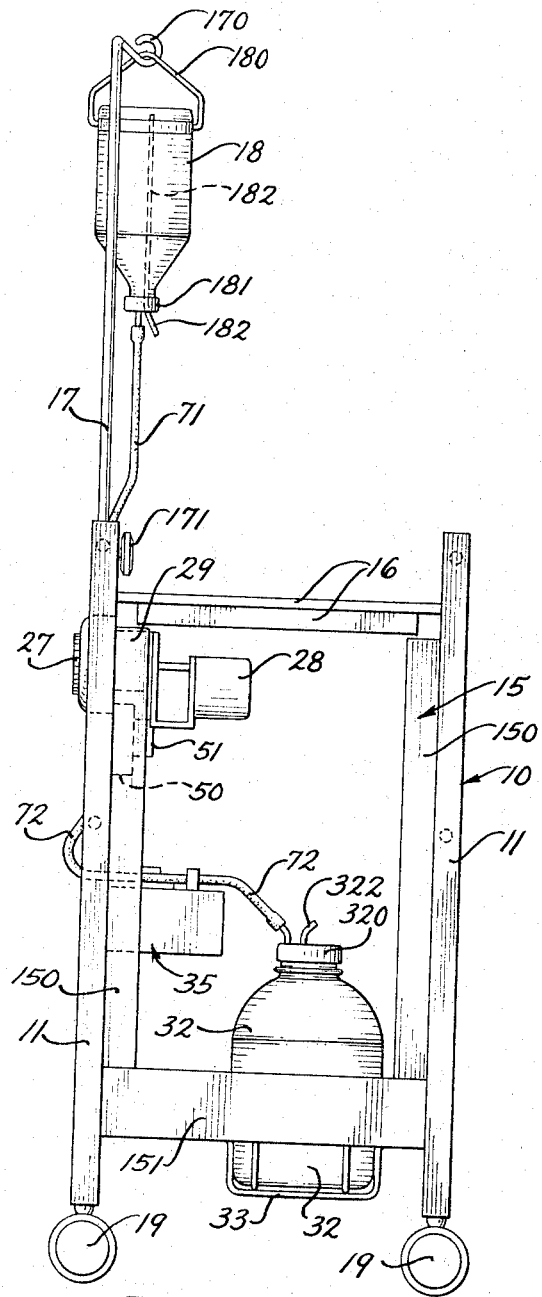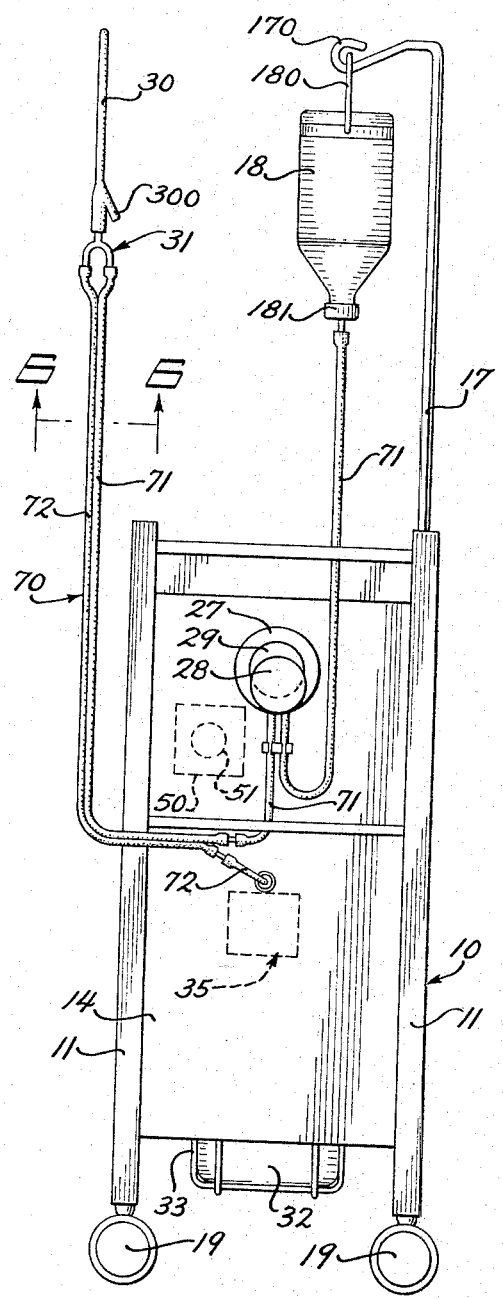

3,329,147
APPARATUS FOR BLADDER IRRIGATION AND MEDICATION
James Barron, 2535 Amberly, Birmingham, Mich. 48010
Filed Nov. 27, 1964, Ser. No. 414,063
8 Claims. (Cl. 128—230)

Physicians and surgeons are cognizant of the fact that catheterization of the urinary bladder is not a harmless procedure inasmuch as tests have shown that bacteriuria is present in patients having indwelling catheters within 24 hours to four days, and could not be prevented by systemic use of antibiotics to any significant degree.

To alleviate the problem of increase of bacteriuria due to extended periods of catheterization of the urinary bladder, emphasis has been placed on the use of indwelling triple lumen catheters through which gravity drip antibiotics or other medication is introduced into the bladder. This method has proven to be unsatisfactory for one or more of the following reasons:

(a) There is no thorough mixing of the antibiotics and/or medicant in the bladder.
(b) The triple lumen catheter required is too large for catheterization without danger of creating substantial pain, and is in most instances extremely uncomfortable to the patient. In the case of the female patient, the larger size catheters ofttimes create a traumatic condition in the urethra.
(c) There is a high percentage of patients who develop bacteriuria under the gravity drip method.
(d) The gravity drip method requires careful attention on the part of the nursing staff.
(e) The gravity drip method does not provide routine distention of the bladder to prevent contraction or decrease of the capacity of the bladder ofttimes occurring as a result of long term catheterization of patients.

With the foregoing in view, it is the primary object of the instant invention to provide an improved apparatus for bladder irrigation and/or medication which employs a minimum size catheter and which affords a maximum of patient comfort.

A further object of the invention is to provide an improved apparatus for bladder irrigation and/or medication whereby a selected interval automatic program of intermittent bladder filling and draining is accomplished which eliminates the usual contraction of the bladder generally experienced by long term catheterization of patients.

Another object of the invention is to provide an improved power operated automatic means for irrigating and/or applying medicant to the urinary bladder comprising filling the bladder to a selected extent with a bladder irrigation and/or medication fluid, and intermittently draining the bladder, all with complete patient comfort, and which will readily admit of patient ambulation within reasonable hospital or home limits.

Other objects of the invention will become apparent by reference to the following detailed description taken in connection with the accompanying drawings in which:

FIG. 1 is a front elevational view of an apparatus for bladder irrigation and medication embodying the invention.

FIG. 2 is a side elevational view of the left side of the apparatus as shown in FIG. 1.

FIG. 3 is a rear elevational view.

FIG. 4 is a side elevational view of the right side of the apparatus as shown in FIG. 1.

FIG. 5 is a diagrammatic view showing the hydraulic system preferably employed.

FIG. 6 is an enlarged cross sectional view taken on the line 6—6 of FIG. 4 showing the double extruded tube preferably employed between the apparatus and the catheter.

FIG. 7 is a side elevational view of the solenoid controlled cycle valve of the hydraulic system shown in its OPEN or Bladder Drain Position.

FIG. 8 is a side elevational view of the solenoid controlled cycle valve of the hydraulic system shown in its CLOSED or Bladder Fill Position.

Figure 9:
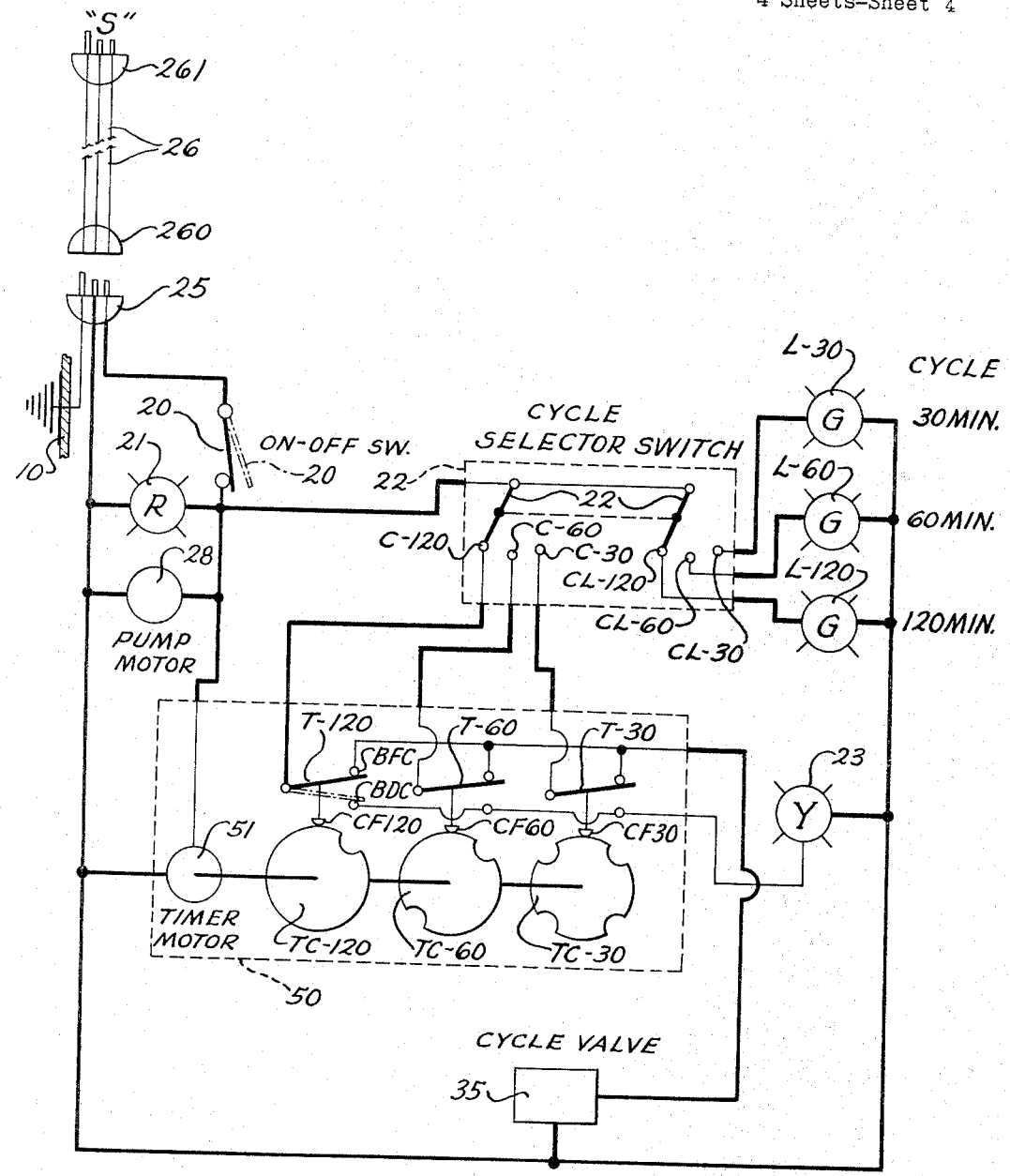
FIG. 9 is an electrical diagram showing the electrical circuit and equipment preferably employed.

Before describing the apparatus of the invention in detail, the novel means for irrigation and medication of the bladder herein disclosed has a number of prime advantages and results heretofore considered either unnecessary or unattainable. Among these advantages, the following are deemed important:

(a) A small #12 or #14 double lumen catheter may be employed rather than the normally used #18 or #20 triple lumen catheter.
(b) Ambulation of the patient is allowed which is important to rapid recovery.
(c) A slow intermittent filling of the bladder followed by a relatively rapid bladder drainage simulates normal bladder activity whereby to prevent abnormal short or long term contraction of the bladder.
(d) A prolonged contact is provided between the irrigation agent with or without medicant therein and urine in the bladder.
(e) Bladder muscles which quickly weaken in the absence of normal bladder distention and contraction are exercised whereby to aid in patient recovery.
(f) Urine collected in the bladder is drained therefrom simultaneously with the irrigation fluid.
(g) Substantially complete emptying of the bladder at frequent intervals prevents accumulation of sludge therein.
(h) Each Bladder Irrigation Cycle consists of a Bladder Fill Cycle wherein an irrigation fluid with or without medicant therein is continuously and uniformly pumped into the patient's bladder for selected periods of time to fill and expand the bladder, and a relatively short Bladder Drain Cycle following the said Bladder Fill Cycle uring which time the irrigation fluid continues to be pumped but through the drain from the bladder as the bladder drains acting as an aid to thorough drainage of the bladder.
(i) Test usage of the method and apparatus of the invention has shown a marked prevention or reduction of bacteriuria, and the prevention of the annoying effects of abnormal bladder contraction normally occurring in connection with the extended indwelling catheterization of patients in post operative abdomino-perineal resections, colon resections, and in other cases.

Referring now to the drawings wherein like reference characters refer to like and corresponding parts throughout the several views, the particular improved apparatus for bladder irrigation and medication disclosed herein will now be described in detail.

The particular embodiment of the apparatus for bladder irrigation and medication disclosed herein for illustrative purposes preferably is mounted on and contained in a mobile cabinet 10 which is shown to have four corner legs 11, a front panel 12, left and right side panels 13 and 14 respectively, a rear partial enclosure 15 consisting of a pair of side elements 150 and a lower element 151, and a top 16. The corner legs 11 extend upwardly above the top 16, and are suitably capped. Extending upwardly from the rear right corner leg 11 is a preferably vertically adjustable post 17 having a hooked cantilever arm 170 onto which is hung in inverted disposition a bottle type fluid container 18 having a bail 180 and a spout type vented cap 181 to which a tubular irrigation tube 70 is connected. The container 18 may contain a suitable irrigating fluid or medicated irrigating fluid as the patient may require. A set screw 171 controlled by a hand knob near the top of the right rear corner leg is preferably employed to secure the post 17 in the proper adjusted position to support the fluid container 18 at the preferred elevation to assure proper gravity feed therefrom. Suitable casters 19 extend from the lower ends of the legs 11 to provide for mobility of the cabinet 10 and the apparatus carried thereby.

In the illustrative embodiment of the invention disclosed herein there are three Bladder Irrigation Cycles, each consisting of a Bladder Fill Cycle and a Bladder Drain Cycle. The Bladder Irrigation Cycles are 30, 60 and 120 minutes in duration, and consists respectively of a 25, 55 and 115 minute Bladder Fill Cycle and a 5 minute Bladder Drain Cycle. With such Bladder Irrigation Cycles, the patient's bladder is gradually filled with bladder irrigating fluid, including medication if desirable, and then drained relatively rapidly. During the Bladder Drain Cycle, the pumping of the irrigating fluid is continued and enters the drainage tube 72 in aid of drainage from the bladder or irrigating fluid which has been pumped thereinto during the previous Bladder Fill Cycle. This provides a near natural rythmn of bladder expansion and contraction and the removal of sludge from the bladder, all of which is deemed desirable in the alleviation or cure of many bladder disorders.

As shown in FIG. 1, the front panel 12 of the cabinet 11 has mounted therethrough an ON-OFF switch 20 with an ON Red Light 21. Also mounted on the front panel 12 of the cabinet 11 is a three station Irrigation Cycle Selector Switch 22 with 30, 60 and 120 minute Bladder Irrigation Cycle positions. Indicator Lights L–30, L–60 and L–120 are preferably employed to indicate clearly which of the said Bladder Irrigation Cycles has been selected and is operative when the ON-OFF switch is in its ON position.

On the left side panel 13 of the cabinet 10 is mounted a preferably recessed male current supply connector 25. A current supply extension cord 26 having a female connector 260 and a male connector 261 is connectable to the said current supply connector 25 and to a source S of 60 cycle alternating current, see FIGS. 2 and 9.

On the right side panel 14 of the cabinet 10 is mounted a constant displacement roller type pump 27 driven by a suitable fractional horsepower motor 28 through reduction gearing 29 preferably to deliver 41.6 cc. per hour to a suitable double lumen catheter 30 disposed when the bladder irrigation apparatus is to be used through the urethra of a female patient or the penis of a male patient into the patient's bladder where it is anchored by such means as a conventional inflated bubble or balloon (not shown) which is included as an element of the catheter. A relatively small double lumen catheter 30 issued, with one lumen for the passage of fluid to and from the bladder and the other for the purpose of inflating the anchorage bubble or balloon element of the catheter through the anchorage inflation nipple 300 extending therefrom.

The pump 27 operates continuously during the entire cycle of any selected Bladder Irrigation Cycle of operation of the improved apparatus for bladder irrigation disclosed herein. In other words, when the ON-OFF switch 20 is in its ON position, the pump 27 is always operational, and, as later will become obvious, the selected Bladder Irrigation Cycle automatically repeats until the said ON-OFF switch 20 is moved to its OFF position.

The hydraulic system preferably employed in the instant embodiment of the invention is best shown more or less diagrammatically in FIGS. 5, 7 and 8, and consists of a bottle type fluid container 18 which may have a capacity of one (1) liter, for example, which capacity is sufficient to provide an adequate supply of irrigation fluid, medicated or unmedicated, to complete a plurality of Bladder Irrigation Cycles, each consisting of a Bladder Fill Cycle and a Bladder Drain Cycle. During all Bladder Irrigation Cycles, irrigation fluid from the fluid container 18 is supplied by gravity to the constant displacement roller type pump 27 through a suitable gravity supply irrigation tube 71 connected to the inlet 270 of the said pump 27. During the Bladder Fill Cycle, irrigation fluid is pumped by the said pump 27 through the outlet 271 thereof and an irrigation tube 71 to and through the catheter 30 to the bladder of the patient, the catheter 30 previously having been properly inserted and preferably anchored into the patient's bladder. As later pointed out in detail, during the Bladder Drain Cycle, irrigation fluid continues to be pumped by the said pump 27 through the outlet 271 thereof through the irrigation tube 71 but is diverted to a preferably resilient flexible drainage tube 72 which may be somewhat larger than the irrigation tube 71. In the particular apparatus illustrating the invention described herein, a constant displacement pump 27 having a capacity of 41.6 cc. per hour was selected as desirable, although other types of pumps and/or capacities may be employed.

The irrigation tube 71 is connected to the catheter 30 through one branch 311 and the stem 310 of a suitable Y-connector 31. The branch 312 of the said Y-connector 31 accommodates the said resilient flexible drainage tube 72 which is connected at its lower end to a suitable collector bottle 32 supported in the lower portion of the mobile cabinet 10 on a suitable basket 33 provided for the purpose. The said collector bottle 32 is somewhat larger than the bottle type irrigation container 18 and is a spout type cap 321 having an air vent 322. The drain tube 72 extends through a normally open solenoid controlled cycle valve 35 which is closed to prevent drainage from the bladder of the patient through the drainage tube 72 when the filling or partially filling the patient's bladder during the Bladder Fill Cycle with selected irrigation or medicated irrigation fluid from the fluid container 18. The extent to which any patient's bladder would be filled during any Bladder Irrigation Cycle depends upon the particular Bladder Fill Cycle selected.

The cycle valve 35 of the hydraulic system as indicated in FIGS. 7 and 8 preferably consists of a mounting block 36 onto which is a tube support 37 supporting the drainage tube 72 in its normal open condition. The said drainage tube 72 extends longitudinally of the cycle valve 35 below the upper anvil plate 380 of a generally horizontal U-shaped anvil 38 thereof. The base 381 of said anvil 38 is supported on the mounting block 36 and supports the drainage tube 72 under the said anvil plate 380. An L-shaped lever 39 is pivotally mounted by a pivot 40 on the anvil base 381 and has one leg 390 connected by a spring 41 to an armature 420 of a solenoid coil 42. The other leg 391 of the L-shaped lever 39 is normally contacted and held horizontal by a short length drainage tube 72, see FIG. 7. The resiliency of the said drainage tube 27 moves the L-shaped lever counterclockwise to the cycle valve 35 OPEN position shown in FIG. 7, and occurs when the solenoid 42 is deenergized. When the solenoid 42 is energized, the cycle valve 35 is CLOSED as viewed in FIG. 8, the Bladder Fill Cycle of operation occurs wherein irrigation fluid is pumped to the bladder to fill the same to the extent permitted according to the particular Bladder Irrigation Cycle selected. The OPEN or drain position of the solenoid controlled cycle valve 35 permits drainage from the bladder through the drainage tube 72 during the Bladder Drain Cycle of operation occurring in the illustrative embodiment of the invention for the last 5 minutes of each of the 30, 60 or 120 Bladder Irrigation Cycles of operation of the bladder irrigation apparatus, whichever cycle timing may have been selected.

Inasmuch as the pump 27 operates continuously, irrigating fluid leaving the pump 27 during the Bladder Drain Cycle passes from the irrigating tube 71 through the branches 311 and 312 of the Y-connector 31 to and through a preferably resilient drainage tube 72 into the collector bottle 32. Such flow or irrigation fluid from the Y-connector 31 and drain line 72 of course does not interfere with, but actually improves, the drainage of irrigation fluid having urine and ofttimes sludge mixed therewith from the patient's bladder during each Bladder Drain Cycle. It has been found that the 5 minute Bladder Drain Cycle of the instant embodiment of the invention is sufficient to drain the patient's bladder of substantially all irrigation fluid and urine that may enter the bladder during any of the 25, 55 or 115 minute Bladder Fill Cycles of the 30, 60 or 120 minute Bladder Irrigation Cycles of operation of the apparatus of the invention.

It will be noted that, during the Bladder Fill Cycle of any of the Bladder Irrigation Cycles of operation, the solenoid coil 42 of the cycle valve 35 is energized, and the lever 39 is pivoted to the position shown in FIG. 8 closing the cycle valve 35 which remains closed until the said solenoid coil 42 is deenergized at the end of the Bladder Fill Cycle of any selected Bladder Irrigation Cycle. The CLOSED or bladder fill position of the solenoid controlled cycle valve 35 permits filling of the bladder during the Bladder Fill Cycle of any selected Bladder Irrigation Cycle of operation of the apparatus for bladder irrigation and/or medication of the invention. For convenience, the irrigation tube 71 and the drainage tube 72 between the Y-connector at the catheter 30 and the mobile cabinet 10 are preferably joined as a double tube unit 70, see FIGS. 4 and 6, thus making it quite easy for a catheterized patient to walk about his or her hospital room, ward or corridor between or during Bladder Irrigation Cycles whereby to improve patient recovery during long periods of bladder treatments.

Reference is now made to FIG. 9 in which is disclosed the electric circuit preferably employed to actuate and control the several elements of the hydraulic circuit hereinbefore described in detail.

Power is preferably received by the apparatus for bladder irrigation and medication from a source S of 110–115 v. electric current through a male connector 25 mounted on the mobile cabinet 10 and grounded thereto. A suitable extension cord 26 having a female connector 260 and a male connector 261 is connected between the said male connector 25 and the source S of electric current at a conveniently located electric base plug, not shown. The length of the extension cord 26 is preferably such as will permit the catheterized patient to push and walk with the mobile cabinet 10 which carries the apparatus of the invention. Thus, a patient may be permitted ambulation during any Bladder Irrigation Cycle for a distance permitted by the extension cord 26. However, the patient may take extended walks while catheterized between one or more Bladder Irrigation Cycles by removing the extension cord 26 and pushing the mobile cabinet ahead of him or her.

The ON-OFF switch is shown in FIG. 9 in dot and dash lines when in its OFF position and in a full line when in its ON position. When the ON-OFF switch is in its ON or closed position, current is supplied from the male connector 25 to the entire electric circuit, at which time the ON Red Light 21 is lighted. The closing of the ON-OFF switch 20 supplies current to the pump motor 28 of the constant displacement roller pump 27 to drive it in the direction of the arrows R in FIG. 5. Preferably prior to the closing of the ON-OFF switch 20, the Cycle Selector Switch 22 is turned to the selected cycle time; namely, for a 30, 60 or 120 minute Bladder Irrigation Cycle. The said Cycle Selector Switch 20 is preferably a triple pole double contact switch operated from a single knob to any one of three positions. One set of contacts C–30, C–60 and C–120 supplies current to the particular selected Timer Switches T–30, T–60 or TT–120 respectively, while a second set of contacts CL–30, CL–60 and CL–120 simultaneously and respectively supplies current to the corresponding Green Indicator Light L–30, L–60 or L–120 showing which Bladder Irrigation Cycle has been selected. The Timer Switches T–30, T–60 and T–120 are preferably double throw type micro switches. Obviously, other types of Cycle Selector Switches, Timer Switches and indicator means may be employed to accomplish the purpose.

The placing of the ON-OFF switch 20 in its ON or closed position shown in FIG. 9 also starts the motor 51 of the timer 50 whereupon all of the timer cams TC–30, TC–60 and TC–120 ar turned by the said timer motor 51 at the rate of one revolution every two minutes. The timer cam TC–30 has four dwells D therein whereby to permit the cam follower CF–30 to fall into one of them every thirty minutes. The timer cam TC–60 has two dwells therein whereby to permit the cam follower CF–60 to fall into one of them every sixty minutes. The cam follower CF–120 has one dwell therein thereby permitting the cam follower CF–120 to fall into it very one hundred twenty minutes.

If, for example, the Cycle Selector Switch 22 has been turned to its C–120 or 120 minute Bladder Irrigation Cycle position, current is supplied to and energizes the solenoid 42 of the cycle valve 35 thereby causing the cycle valve 35 to move to its CLOSED position as shown in FIG. 8 whereby to initiate the Bladder Fill Cycle. In the instant example, the Bladder Fill Cycle would be 115 minutes in duration. At the end of the Bladder Fill Cycle, the cam follower CF–120 would drop into the dwell D of the timer cam TC–120 and move the timer switch T–120 from its bladder fill contact BFC to its bladder drain contace BDC whereon the cycle valve 35 would open as shown in FIG. 7 whereby to initiate the Bladder Drain Cycle, which in the instant example would be 5 minutes in duration. At the completion of the Bladder Drain Cycle, the cam follower CF–120 would rise out of the dwell D of the timer cam TC–120 and move the timer switch T–120 from its bladder drain contact BDC to its bladder fill contact BFC, thereby starting another Bladder Irrigation Cycle. If an additional Bladder Irrigation Cycle is not desired, the ON-OFF switch 20 is turned to its OFF position whereupon the entire apparatus ceases to function.

To permit a nurse or patient to known when the Bladder Drain Cycle occurs, and using the example of the Cycle Selector Switch 22 having been turned to its C–120 or 120 minute Bladder Irrigation Cycle position, when the cam follower CF–120 drops into the dwell D of the timer cam TC–120, the timer switch T–120 moves from its cycle valve CLOSED position, shown diagrammatically by full line in FIG. 9 to its cycle valve OPEN position shown by the double dot and dash line in FIG. 9, which permits the cycle valve 35 to OPEN and at the same time supplies electric current to light the DRAIN Yellow Light 23 which stays lighted until the 5 minute Bladder Drain Cycle is complete.

Upon completion of the Bladder Drain Cycle, the cam follower CF–120 rises out of the dwell D of the timer cam 120, and the timer switch T–120 moves from its said cycle valve OPEN position to its said cycle valve CLOSED position whereupon the said cycle valve is closed, and a new Bladder Irrigation Cycle is initiated unless the ON-OFF switch 20 is turned to its OFF position whereupon the apparatus ceases to function.

Like and similar operation of the apparatus takes place when the Cycle Selector Switch 20 is turned to either the 60 minute or 30 minute Bladder Irrigation Cycle position and the ON-OFF switch 20 is turned ON, except that the length of time of the Bladder Fill Cycle becomes 55 and 25 minutes respectively each followed by a 5-minute Bladder Drain Cycle.

Although the 30, 60 or 120 Bladder Irrigation Cycles have proven by a series of tests to provide an adequate selection of length of time for bladder irrigation and drain with accompanying simulation of normal bladder distention and contraction, it is obvious that other timing of Bladder Irrigation Cycles may be made available by the employment of other timers or timer cams.

It is apparent that many changes may be made in the apparatus of the invention disclosed herein including the

I claim:
1. An apparatus for bladder irrigation and medication of a catheterized patient employing a single catheter lumen performing one or a plurality of bladder irrigation cycles, each consisting of a bladder fill cycle and a bladder drain cycle, comprising
- an irrigation fluid container and a bladder drainage container, each vented to atmosphere,
- a Y-connector with the stem thereof connected to said catheter,
- an irrigation tube connected between the irrigation fluid container and one branch of said Y-connector,
- a drainage tube connected between the other branch of said Y-connector and said bladder drainage container,
- an electric motor driven pump means providing a continuous flow of irrigation fluid through said irrigation tube to and through said one branch of said Y-connector,
- drain valve means adapted to interrupt flow through said drainage tube when closed,
- electric timer controlled means closing said drain valve means initiating a bladder irrigation cycle whereby to establish a bladder fill cycle wherein irrigation fluid is pumped for a given period of time to and through said catheter into the patient's bladder,
- said timer controlled means opening said valve means at the end of said bladder fill cycle whereby to establish a drainage cycle of a relatively shorter period of time than said bladder fill cycle wherein irrigating fluid and urine accumulated in the bladder during the bladder fill cycle drains through said drainage tube into said bladder drainage container simultaneously with the flow of irrigation fluid from said pump through said irrigation tube and said drainage tube into said bladder drainage container,
- said timer controlled means reclosing said drain valve means at the end of each bladder drain cycle whereby to initiate another bladder irrigation cycle,
- the drainage of the patient's bladder being aided by the said pump flow of irrigation fluid through said drain line during each said drainage cycle, and
- an ON-OFF switch means for applying electric current to said apparatus to start or stop the same at the beginning or end or during any irrigation cycle.

2. An apparatus for bladder irrigation and medication as claimed in claim 1 wherein said timer means is adapted to establish any of a plurality of irrigation cycles each for different periods of time, and manual means selecting one of such irrigation cycles.

3. In an apparatus as claimed in claim 1, mobile means mounting said apparatus including means supporting said irrigation fluid container at an elevation above said pump and means supporting said drainage container at an elevation below said catheter when said apparatus is in use.

4. An apparatus for bladder irrigation and medication of a catheterized patient employing a single catheter lumen performing one or more bladder irrigation cycles, each consisting of a bladder fill cycle and a bladder drain cycle, comprising
- an irrigation fluid container and a bladder drainage container, each vented to atmosphere,
- a Y-connector with the stem thereof connected to said catheter, an irrigation tube connected between the irrigation fluid container and one branch of said Y-connector,
- a drainage tube connected between the other branch of said Y-connector and said bladder drainage container,
- an electric motor driven continuously operating constant displacement pump providing a continuous flow of irrigation fluid through said irrigation tube connected in series in said irrigation tube with its inlet disposed toward said irrigation fluid container and its outlet disposed toward said one branch of said Y-connector,
- normally open solenoid closed drain valve means adapted to interrupt flow through said drainage tube,
- timer means actuating said solenoid at the beginning of a bladder irrigation cycle closing the said normally open drain valve means establishing the bladder fill cycle wherei nirrigation fluid is pumped for a given period of time to and through said catheter into the patient's bladder to distend the same,
- said timer means deactuating said solenoid at the end of said bladder fill cycle permitting said drain valve to open establishing the drainage cycle for a relatively shorter period of time than said bladder fill cycle wherein irrigating fluid and urine accumulated in the bladder during the bladder fill cycle drains through said drainage tube into said bladder drainage container simultaneously with and aided by the flow of irrigation fluid from said pump through said irrigation tube and said drainage tube into said bladder drainage container,
- said timer means again actuating said solenoid at the end of said drainage cycle whereby to establish another bladder irrigation cycle,
- the drainage and attendant normal contraction of the patient's bladder being aided by the said pumped flow or irrigation fluid through said drain line during said drainage cycle, and an ON-OFF switch means for applying electric current to said apparatus to start or stop the same at the beginning or end or during any irrigation cycle.

5. An apparatus for bladder irrigation and medication as claimed in claim 4 wherein said timer means is adapted to establish any of a plurality of irrigation cycles each for different periods of time, and manual means selecting one of such irrigation cycles.

6. In an apparatus as claimed in claim 4, mobile means mounting said apparatus including means supporting said irrigation fluid container at an elevation above said pump and means supporting said drainage container at an elevation below said catheter when said apparatus is in use.

7. An apparatus for bladder irrigation and medication of a catheterized patient employing a single catheter lumen performing one of a plurality of bladder irrigation cycles, each consisting of a bladder fill cycle and a bladder drain cycle, comprising,
- an irrigation fluid container and a bladder drainage container, each vented to atmosphere,
- a Y-connector with the stem thereof connected to said catheter, an irrigation tube connected between the irrigation fluid container and one branch of said Y-connector,
- a drainage tube connected between the other branch of said Y-connector and said bladder drainage container,
- an electric motor driven continuously operating constant displacement pump means providing a continuous flow of irrigation fluid through said irrigation tube connected in series in said irrigation tube with its inlet disposed toward said irrigation fluid container and its outlet disposed toward said one branch of said Y-connector,
- normally open solenoid closed drain valve means adapted to interrupt flow through said drainage tube when closed,
- continuously operating timer means actuating said solenoid and closing the said normally open drain valve means at the beginning of each bladder irrigation cycle establishing the bladder fill cycle for any one of a plurality of different periods of time wherein irrigation fluid is pumped for a selected period of time to and through said catheter into the patient's bladder to distend the same,
- said timer means deactuating said solenoid at the end of each of said bladder fill cycle opening said drain valve establishing the drainage cycle for a relatively shorter period of time than said fill cycle wherein irrigating fluid and urine accumulated in the bladder during the bladder fill cycle drains through said drainage tube into said bladder drainage container simultaneously with and aided by the flow of irrigation fluid from said pump through said irrigation tube and said drainage tube into said bladder drainage container, said timer means again actuating said solenoid and closing said normally open drain valve at the end of each said bladder drain cycle whereby to initiate another bladder irrigation cycle, the drainage and attendant normal contraction of the patient's bladder being aided by the said pumped flow of irrigation fluid through said drain line during each said drainage cycle, multiple position switch means for manually selecting the operation of said timer means maintaining said solenoid actuated drain valve closed for one of said plurality of different periods of time, and an ON-OFF switch means for applying electric current to said apparatus to start or stop the same at the beginning or end or during any irrigation cycle.

8. In an apparatus as claimed in claim 7, mobile means mounting said apparatus including means supporting said irrigation fluid container at an elevation above said pump and means supporting said drainage container at an elevation below said catheter when said apparatus is in use.

References Cited

UNITED STATES PATENTS

| | | | |
|---|---|---|---|
| 844,478 | 2/1907 | Spalding | 128—349 |
| 1,553,859 | 9/1925 | Hein | 128—276 |
| 1,843,169 | 2/1932 | McKesson | 128—276 |
| 1,913,229 | 6/1933 | Bordier | 128—349 |
| 2,280,992 | 4/1942 | Wright et al. | 128—276 |
| 2,855,934 | 10/1958 | Daughaday | 128—349 |
| 2,879,767 | 3/1959 | Kulich | 128—349 |
| 3,142,298 | 7/1964 | Koski et al. | 128—276 |
| 3,233,609 | 2/1966 | Leucci | 128—349 |

RICHARD A. GAUDET, *Primary Examiner.*

C. F. ROSENBAUM, *Assistant Examiner.*